US008752805B2

(12) United States Patent
Pilz et al.

(10) Patent No.: US 8,752,805 B2
(45) Date of Patent: Jun. 17, 2014

(54) PRESSURE CONTROL VALVE

(75) Inventors: Martin Pilz, Weissach Im Tal (DE);
Benjin Luo, Stuttgart (DE);
Mehmet-Fatih Sen, Hemmingen (DE);
Frank Wauro, Korntal-Muenchingen
(DE); David Jayanth, Karnataka (IN)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 13/387,659

(22) PCT Filed: Jun. 10, 2010

(86) PCT No.: PCT/EP2010/058141
§ 371 (c)(1),
(2), (4) Date: Apr. 9, 2012

(87) PCT Pub. No.: WO2011/012366
PCT Pub. Date: Feb. 3, 2011

(65) Prior Publication Data
US 2012/0186678 A1    Jul. 26, 2012

(30) Foreign Application Priority Data
Jul. 29, 2009   (DE) .......................... 10 2009 028 092

(51) Int. Cl.
*F16K 31/00*   (2006.01)
(52) U.S. Cl.
USPC ... 251/14; 251/129.15; 251/282; 137/625.65; 137/625.69
(58) Field of Classification Search
USPC ................. 251/14, 129.07, 129.15, 282, 324; 137/625.65, 625.69
See application file for complete search history.

(56) References Cited

U.S. PATENT DOCUMENTS

| 3,368,791 | A | * | 2/1968 | Wells ........................ 251/129.07 |
| 3,807,454 | A | * | 4/1974 | Westveer .................. 137/625.69 |
| 3,990,477 | A | * | 11/1976 | Johnson .................... 137/625.69 |
| 4,220,178 | A |  | 9/1980 | Jackson |
| 4,648,803 | A |  | 3/1987 | Stephenson et al. |
| 4,913,172 | A | * | 4/1990 | Chou .......................... 132/118 |
| 6,345,804 | B1 | * | 2/2002 | Martin et al. ............ 251/129.15 |
| 7,146,998 | B2 | * | 12/2006 | Nirasawa et al. ........ 137/115.18 |
| 2002/0079002 | A1 | * | 6/2002 | Ueki .......................... 137/625.3 |
| 2005/0217740 | A1 | * | 10/2005 | Segi et al. ................ 137/625.65 |
| 2007/0051414 | A1 |  | 3/2007 | Nakai et al. |
| 2009/0071545 | A1 | * | 3/2009 | Xiang et al. ............. 137/118.02 |

FOREIGN PATENT DOCUMENTS

| CN | 1673591 | 9/2005 |
| EP | 0 851 160 | 7/1998 |
| EP | 1 197 695 | 4/2002 |
| JP | 10-184963 | 7/1998 |
| JP | 2002-122249 | 4/2002 |
| JP | 2002-130494 | 5/2002 |
| JP | 2007-56910 | 3/2007 |
| WO | WO 2007/020895 | 2/2007 |

\* cited by examiner

*Primary Examiner* — John K Fristoe, Jr.
*Assistant Examiner* — Jessica Cahill
(74) *Attorney, Agent, or Firm* — Kenyon & Kenyon LLP

(57) ABSTRACT

A pressure control valve includes a housing, a valve slide guided in the housing, on which at least one inflow control edge is configured, which cooperates with an inflow opening in the housing, a constriction in piston being present adjacent to inflow control edge, which lies at least approximately opposite to a control opening. It is provided that the valve slide have a circumferential annular groove, which lies on the side of the inflow control edge facing away from the constriction and approximately opposite the inflow opening.

11 Claims, 1 Drawing Sheet

PRESSURE CONTROL VALVE

FIELD OF THE INVENTION

The present invention relates to a pressure control valve.

BACKGROUND OF THE INFORMATION

United States Published Patent Application No. 2007/0051414 A1 discusses a pressure control valve having a valve slide, which has a section having a reduced diameter ("constriction") that is geometrically specifically designed and lies opposite to the regulating opening. U.S. Pat. No. 4,220,178 also discusses a pressure control valve having a valve slide. The valve slide also has a constriction between the regulating opening and the discharge opening. Such pressure control valves are used, for example, in automatic transmissions of motor vehicles for operating hydraulic couplings that are present there.

SUMMARY OF THE INVENTION

An object on which the exemplary embodiments and/or exemplary methods of the present invention is based is attained by a pressure control valve having the features described herein. Further refinements of the exemplary embodiments and/or exemplary methods of the present invention are described in the further descriptions herein. Important features for the exemplary embodiments and/or exemplary methods of the present invention are also found in the following description and in the drawings, the features being able to be essential for the present invention both alone and also in quite different combinations, without further explicit reference being made to it.

Because of the circumferential groove (annular groove), which is opposite the inflow opening, a flow profile is produced which minimizes the hydraulic forces in the radial direction and thereby shortens the coupling filling time. The groove according to the exemplary embodiments and/or exemplary methods of the present invention becomes noticeable particularly upon the "ripping open" of the inflow control edge. For, as soon as the inflow control edge "rips open", that is, the inflow opening at least approximately releases, the fluid flows in the direction of the regulating opening. In this case, the circumferential annular groove in the valve slide ensures a rapid pressure equalization in the circumferential direction of the valve slide, whereby a transverse hydraulic force acting on the valve slide is at least minimized. This particularly applies if only a single inflow channel is provided. Using this measure, one achieves symmetrical inflow at the inflow control edge towards the regulating opening at the same time. In overall terms, the exemplary embodiments and/or exemplary methods of the present invention improve the flow of the hydraulic fluid, and instabilities at the inflow control edge are avoided.

The transverse forces mentioned in this instance are reduced, in addition, if the inflow opening does not include two radial channel bores, because of a circumferential annular groove in the housing, for example. This, however, is meaningful only if a flow on both sides is also provided in a valve block into which the pressure control valve is able to be inserted. Using this measure, the transverse hydraulic forces are also reduced. With respect to the reduction in the transverse force, it is naturally best if a multiplicity of inflow openings, that are situated uniformly distributed about the circumference, is provided in the form of radial channels.

For the flow profile of the hydraulic fluid and the reduction of leakages it is advantageous if the annular groove is at a distance from the inflow control edge.

It is also favorable, for the flow guidance, if the width of the annular groove is less than the width of the inflow opening. This particularly applies when the inflow opening is formed by a circumferential annular groove in the housing. Such a circumferential annular groove additionally contributes to a pressure equalization over the circumference of the valve slide.

It has turned out to be especially advantageous if, immediately after the control edge, the angle of a beveled edge of the constriction on the valve slide, at the inflow control edge, to a longitudinal axis of the valve slide is between 52° and 72°, and may more specifically be between 60° and 64°, and may very specifically be 62°. This angle leads to a sufficiently great diversion of the hydraulic flow, that is first radial, without unwantedly strong turbulences and pressure losses occurring because of this diversion.

One additional advantageous embodiment stands out in that, in a further course, as seen from the inlet control edge, the constriction on the valve slide has a section that is curved concavely. This concavely curved section leads to an additional gradual diversion of the hydraulic flow towards the regulating opening, which gradually takes place because of the concave curvature, and is therefore connected with only slight pressure losses. With that, the jet is guided along the curvature in such a way that the pressure control valve according to the present invention is able to be very dynamic, but also operates in a stable manner and reacts in an insensitive manner to interferences.

A radius of curvature of the concavely curved section of approximately 3.5 mm for this valve slide has turned out to be particularly advantageous, in this instance, this value, among other things, also depending on the properties of the hydraulic fluid and the general dimensions of the pressure control valve. It may also be a little larger or a little smaller, if necessary.

The abovementioned advantages are boosted even more if, because of the concavely curved section, the diameter of the constriction on the valve slide is at a minimum, and in the further course, after the curved section, the constriction has a section having a constant diameter. The beginning of the section having a constant diameter is selected so that the jet, while flowing through the concave section, loses contact with the valve slide at exactly this location and flows on tangentially and impinges directly upon the inner annular groove of the regulating channel.

In a further development of this, it is provided that the section having the constant diameter be bordered by a radial wall section, at whose radial outer end a discharge control edge is formed which cooperates with a discharge opening in the housing. With that, the constriction extends from the inflow control edge to the discharge control edge, which also has advantages from the standpoint of production engineering. All-in all, an especially optimal flow profile is produced, with respect to the hydraulic forces, by the geometry thus provided of the constriction on the valve slide. In particular, the hydraulic forces are minimized in the axial direction, which shortens the coupling filling time during the application to a motor vehicle transmission. Such a valve is thus able to function extremely dynamically, but, on the other hand, to be stable and insensitive to interferences.

This applies all the more if the width of the regulating opening is only a little smaller than the width of the constriction on the valve slide from the inflow control edge to the discharge control edge. Thereby, the flow guided in the constriction of the valve slide is collected again particularly well in the flange. This, in turn, applies particularly if the regulating opening is formed by a circumferential inner annular groove in the housing.

A specific embodiment of the present invention is elucidated in exemplary fashion below, with reference to the appended drawings.

DETAILED DESCRIPTION

Figure 1:
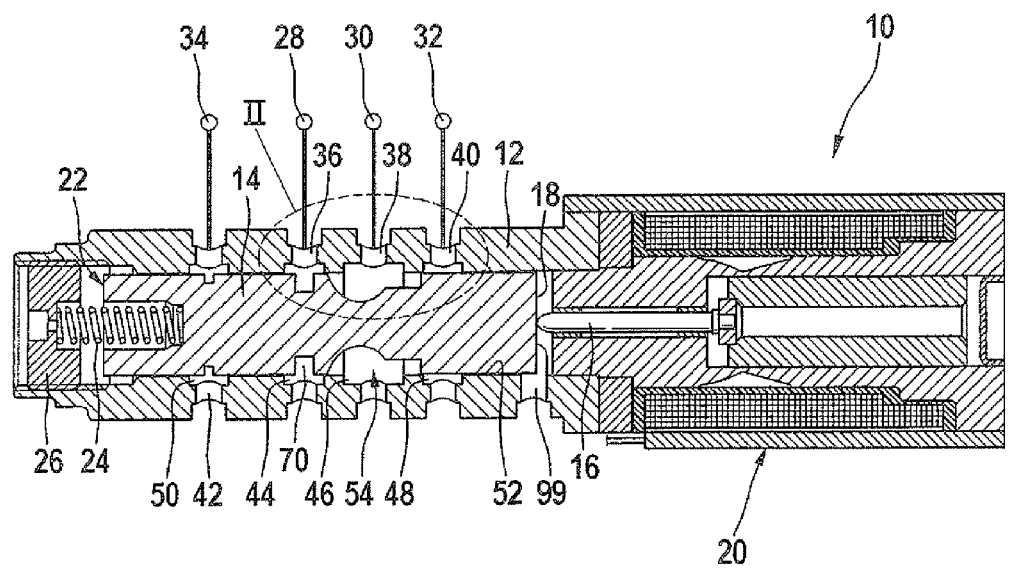
FIG. 1 shows a longitudinal section through a pressure control valve.

In the drawing, a pressure control valve bears overall reference numeral 10. It is used for the control and operation of a hydraulic coupling in an automatic transmission that is not shown, for instance, in a stepped automatic transmission of a motor vehicle, or even for controlling or operating positioning cylinders in dual-clutch transmissions and CVT (continuously variable transmissions). Pressure control valve 10 includes a flange housing 12, in which a piston-like valve slide 14 is guided in a sliding manner. An end face 18 of valve slide 14 is able to be acted upon by an electromagnetic operating device 20 via a coupling pin 16. At the opposite end 22 of valve slide 14, a pressure spring 24 engages, which is supported on a screw plug 26 of flange housing 12.

In the installed position, pressure control valve 10 is connected fluidically to an inflow connection 28, a regulating connection 30, a discharge connection 32 and a return connection ("feedback channel") 34. Return connection 34 and regulating connection 30 are fluidically connected to each other. Inflow connection 28 is connected to a pressure source that is not shown in the drawings, such as a hydraulic pump. Regulating connection 30 leads to the hydraulic coupling that is to be operated, and thus the hydraulic pressure, that is to be regulated, is present at regulating connection 30. Discharge connection 32 is connected to a low-pressure region. For this purpose, flange housing 12 has four channels 36 to 42 that are axially at a distance from one another and run radially, which open out in annular grooves 44 to 50 assigned to them. Annular grooves 44 to 50 are configured in an inner wall surface of a guide bore 52, in which valve slide 14 is guided in flange housing 12.

Figure 2:
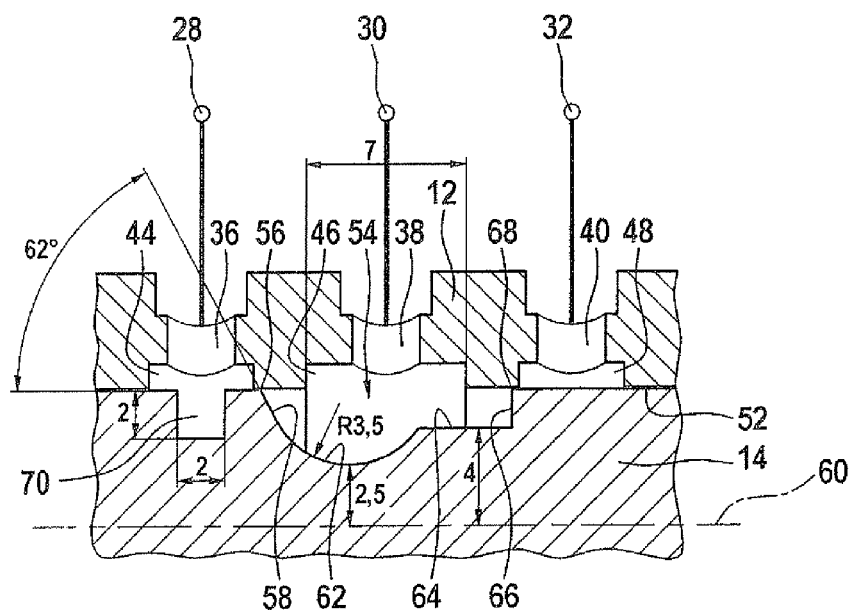
FIG. 2 shows a detail II of FIG. 1.

Valve slide 14 has a section 54, which has a reduced diameter, the course of the diameter being specific, and this will be explained more accurately below. Section 54 of valve slide 14 will be designated below as a "constriction", to simplify matters. It extends over the entire circumferential direction of valve slide 14, and is thus rotationally symmetrical. The constriction in section 54 is shown wider in the detail in FIG. 2, it lies approximately opposite regulating annular groove 46. As may be seen in FIG. 2, constriction 54 is bordered on its left side, as seen in FIG. 2, by an inflow control edge 56, which cooperates with inflow annular groove 44 in a manner that will be shown. Constriction 54 is thus directly adjacent to inflow control edge 56. Directly at control edge 56, constriction 54 has a straight running beveled edge 58, which is at an angle, with respect to a longitudinal axis 60 of valve slide 14, of approximately 62°.

If the contour of constriction 54 in FIG. 2 is followed farther to the right, a concavely curved section 62 follows beveled edge 58. Its radius of curvature in this case amounts to 3.5 mm. Because of concavely curved section 62, the radius of valve slide 14 in the vicinity of constriction 54 is a minimum, in this case 2.5 mm. Concavely curved section 62 extends slightly beyond this minimum to a section 64 at a constant radius of 4 mm. This, in turn, is bordered by a radial wall section 66, at whose radial outer end a discharge control edge 68 is formed, which cooperates with annular groove 48 in guidance bore 52 of flange housing 12, also in a manner that is still to be shown. Consequently, constriction 54 extends in the axial direction from inflow control edge 56 to discharge control edge 68.

As may be seen particularly in FIG. 2, valve slide 14 has a circumferential annular groove 70, which lies on the side of inflow control edge 56 facing away from constriction 54 and approximately opposite inflow annular groove 44. In the specific embodiment shown in the drawing, annular groove 70 has a square cross section having length of side of 2 mm. As seen in the axial direction of valve slide 14, it is at a distance of approximately this quantity from inflow control edge 56. One may see in FIG. 2 that the width of annular groove 70 is less than the width of inflow annular grooves 44.

Pressure control valve 10 works as follows: The desired pressure at regulating connection 30 is set by a corresponding application of current to electromagnetic operating device 20. When the pressure at regulating connection 30 rises above the desired pressure, valve slide 14 moves, which represents, to this extent, a "pressure balance", to the right in FIGS. 1 and 2, until discharge control edge 68 has reached discharge annular groove 48, so that hydraulic fluid is able to flow away. To this extent, discharge annular groove 48 forms a discharge opening. When the pressure at regulating connection 30 falls below the desired level, valve slide 14 moves to the left in FIGS. 1 and 2, until inflow control edge 56 lies in the vicinity of inflow annular groove 44. To this extent, inflow annular groove 44 forms an inflow opening. Now hydraulic fluid is able to flow from inflow connection 28 via inflow channel 36 and inflow annular groove 44 into the vicinity of constriction 54, and thus is able to raise the pressure at regulating annular groove 46 ("regulating opening") again. When the regulating pressure reaches its desired value, a force equilibrium is created and valve slide 14 stands still.

Because of annular groove 70 being axially positioned in valve slide 14, pressure equalization is achieved over the circumference of valve slide 14, which ensures a symmetrical inflow of hydraulic fluid in the direction of constriction 54. Because of the special geometry of the contour of constriction 54, a stable course of flow is additionally assured, which reduces flow forces acting in the axial direction of valve slide 14. Hydraulic transverse forces in the dynamic operation of pressure control valve 10 are also reduced, particularly in the coupling filling process, that is, when a pressure increase at regulating connection 30 is desired. The beginning of section 64 having a constant diameter is selected so that the jet of hydraulic fluid, while flowing through concave section 62, loses contact with valve slide 14 at exactly this location and flows on tangentially and impinges directly upon the inner annular groove or regulating annular groove 46 of regulating channel 38. Finally, this assures a highly dynamic operation of the pressure control valve, which nevertheless operates in a stable manner and in an insensitive manner with respect to interferences.

For the sake of completeness, a leakage connection is designated by 99 in FIG. 1.

What is claimed is:

1. A pressure control valve, for use in a motor vehicle automatic transmission, comprising:
   a housing; and
   a valve slide guided in the housing, on which at least one inflow control edge is configured, which cooperates with an inflow opening in the housing;

wherein a constriction in a section of the valve slide is present adjacent to the inflow control edge, which lies at least approximately opposite to a control opening in the housing, and wherein the valve slide has a circumferential annular groove, which lies on a side of the inflow control edge facing away from the constriction and approximately opposite the inflow opening, wherein the width of the annular groove is less than the width of the inflow opening, and wherein the inflow control edge cooperates with the inflow opening in the housing in such a way that the inflow control edge one of frees and closes a hydraulic connection between the inflow opening and and the control opening; wherein because of a concavely curved section of the constriction, the diameter of the constriction has a minimum, and after the concavely curved section, the constriction has a section having a constant diameter, and wherein the section having the constant diameter is bordered by a radial wall section, at whose radial outer end a discharge control edge is formed which cooperates with a discharge opening in the housing.

2. The pressure control valve of claim 1, wherein the annular groove is at a distance from the inflow control edge.

3. The pressure control valve of claim 1, wherein the inflow opening is formed by a circumferential annular groove in the housing.

4. The pressure control valve of claim 1, wherein the angle of a beveled surface of the constriction at the inflow control edge with respect to a longitudinal axis of the valve slide amounts to between 52° and 72°.

5. The pressure control valve of claim 1, wherein the width of the control opening is smaller than the width of the constriction from the inflow control edge to the discharge control edge.

6. The pressure control valve of claim 1, wherein the angle of a beveled surface of the constriction at the inflow control edge with respect to a longitudinal axis of the valve slide amounts to between between 60° and 64°.

7. The pressure control valve of claim 1, wherein the angle of a beveled surface of the constriction at the inflow control edge with respect to a longitudinal axis of the valve slide amounts to about 62°.

8. The pressure control valve of claim 1, wherein course, as seen from the inflow control edge, the constriction has the concavely curved section.

9. The pressure control valve of claim 8, wherein the radius of curvature of the concavely curved section amounts to approximately 3.5 mm.

10. The pressure control valve of claim 1, wherein the beginning of the section having a constant diameter is selected so that a jet of a hydraulic fluid, while flowing through the concavely curved section, loses contact with the valve slide at exactly this location and flows on tangentially and impinges directly upon the control opening.

11. The pressure control valve of claim 10, wherein the control opening is formed by a circumferential annular groove in the housing.

* * * * *